United States Patent
Lin (10) Patent No.: US 10,197,737 B2
(45) Date of Patent: Feb. 5, 2019

(54) LOW BACK REFLECTION ECHELLE GRATING

(71) Applicant: Intel Corporation, Santa Clara, CA (US)

(72) Inventor: Wenhua Lin, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/719,013

(22) Filed: Sep. 28, 2017

(65) Prior Publication Data

US 2018/0364418 A1 Dec. 20, 2018

Related U.S. Application Data

(60) Provisional application No. 62/521,971, filed on Jun. 19, 2017.

(51) Int. Cl.
*G02B 6/293* (2006.01)
*G02B 5/18* (2006.01)

(52) U.S. Cl.
CPC ....... *G02B 6/29308* (2013.01); *G02B 5/1857* (2013.01); *G02B 5/1861* (2013.01); *G02B 6/2931* (2013.01); *G02B 6/2938* (2013.01)

(58) Field of Classification Search
CPC . G02B 6/2931; G02B 6/2938; G02B 6/29308
See application file for complete search history.

(56) References Cited

U.S. PATENT DOCUMENTS

| | | |
|---|---|---|
| 4,786,133 A | 11/1988 | Gidon et al. |
| 5,911,018 A | 6/1999 | Bischel et al. |
| 6,091,495 A | 7/2000 | Ogawa et al. |
| 6,504,180 B1 | 1/2003 | Heremans et al. |

(Continued)

FOREIGN PATENT DOCUMENTS

| | | |
|---|---|---|
| CN | 1164961 A | 11/1997 |
| JP | 2010102294 A | 5/2010 |

(Continued)

OTHER PUBLICATIONS

Folkert Horst et al., "Echelle grating WDM (de–) multiplexers in SOI technology, based on a design with two stigmatic points," Proceedings of SPIE, SPIE Photonics Europe, (2008), 9 pages.

(Continued)

*Primary Examiner* — Sung Pak
*Assistant Examiner* — Hoang Tran
(74) *Attorney, Agent, or Firm* — Schwabe, Williamson & Wyatt, P.C.

(57) ABSTRACT

Embodiments of the present disclosure are directed toward an optical apparatus that includes a semiconductor layer to propagate light from at least one light source. The optical apparatus may further include a curved echelle grating with a plurality of grating teeth, the echelle grating at an outer side of the semiconductor layer. The curved echelle grating may include a plurality of grating teeth, and a grating tooth of the plurality of grating teeth may have a grating facet and a shadow facet. A shadow facet may have an angle of grating greater than 0 degrees with respect to a normal of a curve of the curved echelle grating. Other embodiments may be described and/or claimed.

18 Claims, 9 Drawing Sheets

(56) References Cited

U.S. PATENT DOCUMENTS

| | | | |
|---|---|---|---|
| 7,283,695 | B2 | 10/2007 | Gaylord et al. |
| 7,702,201 | B2 | 4/2010 | Yeh et al. |
| 8,021,561 | B1 * | 9/2011 | Qian ................ B29D 11/00721 216/24 |
| 8,300,999 | B2 | 10/2012 | Qian et al. |
| 8,737,846 | B2 | 5/2014 | Zheng et al. |
| 9,250,388 | B1 | 2/2016 | Krishnamurthi et al. |
| 9,337,182 | B2 | 5/2016 | Chang et al. |
| 9,395,494 | B2 | 7/2016 | Krishnamurthi et al. |
| 2002/0136481 | A1 | 9/2002 | Mule' et al. |
| 2002/0181856 | A1 | 12/2002 | Sappey et al. |
| 2004/0119080 | A1 | 6/2004 | Hashimoto et al. |
| 2005/0110033 | A1 | 5/2005 | Heremans et al. |
| 2006/0269190 | A1 | 11/2006 | Kim et al. |
| 2006/0285795 | A1 | 12/2006 | Fondeur |
| 2007/0086703 | A1 | 4/2007 | Kirk et al. |
| 2008/0138008 | A1 | 6/2008 | Tolstikhin et al. |
| 2008/0138013 | A1 | 6/2008 | Parriaux |
| 2009/0207873 | A1 | 8/2009 | Jansen |
| 2009/0296752 | A1 | 12/2009 | Giaretta et al. |
| 2010/0296767 | A1 | 11/2010 | Shimizu et al. |
| 2011/0018024 | A1 | 1/2011 | Fukshima et al. |
| 2011/0156183 | A1 | 6/2011 | Liu |
| 2011/0168894 | A1 | 7/2011 | Bratkovski et al. |
| 2011/0286700 | A1 * | 11/2011 | Feng ................ G02B 5/1861 385/37 |
| 2014/0003766 | A1 | 1/2014 | Heck et al. |
| 2014/0086531 | A1 | 3/2014 | Park et al. |
| 2015/0063743 | A1 | 3/2015 | Katou et al. |
| 2015/0063809 | A1 | 3/2015 | Sugiyama et al. |
| 2015/0110440 | A1 | 4/2015 | Bodan et al. |
| 2016/0018595 | A1 | 1/2016 | Krishnamurthi et al. |

FOREIGN PATENT DOCUMENTS

| | | |
|---|---|---|
| KR | 10-20140032212 A | 3/2014 |
| TW | 201312956 A | 3/2013 |

OTHER PUBLICATIONS

Extended Search Report dated Feb. 20, 2018 for European Application No. 15822321.4, 8 pages.

Wim Bogaerts et al., "Silicon-on-Insulator Spectral Filters Fabricated With CMOS Technology," IEEE Journal of Selected Topics in Quantum Electronics, Jan./Feb. 2010, vol. 16, No. 1, pp. 33-44.

Folkert Horst et al., "Silicon-on-Insulator Echelle Grating WDM Demultiplexers With Two Stigmatic Points," IEEE Photonics Technology Letters, Dec. 1, 2009, vol. 21, No. 23, pp. 1743-1745.

International Search Report and Written Opinion dated Jul. 31, 2015, issued in corresponding International Application No. PCT/US2015/030184, 15 pages.

Dazen Feng et al., "Fabrication Insensitive Echelle Grating in Silicon-on-Insulator Platform", IEEE Photonics Technology Letters, Mar. 1, 2011, vol. 23, No. 5, pp. 284-286.

Richard S. Lycett, "Perfect Chirped Echelle Grating Wavelength Multiplexor: Design and Optimization", IEEE Photonics Journal, Apr. 2013, vol. 5, No. 2, 24 pages.

Search Report dated Jul. 4, 2016 for Taiwan Application No. 104118497, 2 pages.

Office Action dated Oct. 31, 2017 for Japanese Application No. 2016-572291, 6 pages.

Notice of Allowance dated Oct. 1, 2015 for U.S. Appl. No. 14/334,260, 10 pages.

Notice of Allowance dated Oct. 20, 2015 for U.S. Appl. No. 14/334,260, 6 pages.

Notice of Allowance dated Mar. 29, 2016 for U.S. Appl. No. 14/971,948, 9 pages.

International Preliminary Report on Patentability dated Jan. 26, 2017 for International Application No. PCT/US2015/030184, 14 pages.

Office Action dated May 25, 2018 for European Application No. 2016-572291, 6 pages.

Office Action dated Aug. 9, 2018 for German Application No. 112015003307.6, 11 pages.

* cited by examiner

Positioning a two layer hard mask on a semiconductor layer, wherein the mask defines a curved echelle grating with a plurality of grating teeth, wherein respective grating teeth of the plurality of grating teeth include a grating facet and a shadow facet, wherein respective shadow facets have an angle of grating greater than 0 degrees as measured with respect to a normal of a curve of the curved echelle grating.

805

Performing a dry etch

810

Removing the mask

LOW BACK REFLECTION ECHELLE GRATING

CROSS REFERENCE TO RELATED APPLICATIONS

The present application claims priority to U.S. Provisional Patent Application No. 62/521,971, filed Jun. 19, 2017, entitled "LOW BACK REFLECTION ECHELLE GRATING," the entire contents and disclosures of which are hereby incorporated by reference in their entireties.

FIELD

Embodiments of the present disclosure generally relate to the field of optoelectronics, and more particularly, to techniques and configurations for an optical device (e.g., multiplexor or demultiplexer) using echelle grating based on the total internal reflection principle and implemented on a silicon-on-insulator platform.

BACKGROUND

Optical multiplexers and de-multiplexers may be considered to be key components in wavelength division multiplexing (WDM) networks for optical interconnects. To send multiple wavelengths (sometimes referred to as "channels") down a single optical fiber, the wavelengths must be multiplexed (i.e., combined) by a multiplexer at one end and de-multiplexed (i.e., separated) by a de-multiplexer at the receiving end. Generally, multiplexer and de-multiplexers that use an echelle grating may be used due to their compact size, lower cost, and their integration ability with other optical components like lasers and detectors.

More specifically, example hybrid integrated transmitters may include a laser, modulator, multiplexer, and one or more passive components on the same silicon substrate chip. On-chip back reflected light from each component may interface coherently and inherently, and degrades the laser transmitter stability in laser relative intensity noise (RIN) and laser side-mode suppression ratio. This degradation may lead to bit error rate (BER) floor generation and transmitter performance degradation over the device operating window.

Similarly, the receiver may include a photodetector, de-multiplexer, and one or more passive components on the same silicon substrate chip. On-chip reflected light from the de-multiplexer and the passive component(s) may interface coherently and inherently, and generate a multi-path interference effect. This multi-path interference effect may produce additional noise at the receiver.

Legacy total internal reflection echelle grating solutions could produce higher back reflection of light to the laser and detectors, resulting in laser instability at the transmitter or additional noise at the receiver.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure are directed toward an optical apparatus that includes a semiconductor layer to propagate light from at least one light source, for example a laser. The optical apparatus may include a curved echelle grating with a plurality of grating teeth at an outer side of the semiconductor layer. The curved echelle grating may include a plurality of grating teeth, and a grating tooth of the plurality of grating teeth may have a grating facet and a shadow facet. A shadow facet may have an angle of grating greater than 0 degrees with respect to a normal of a curve of the curved echelle grating. For example, in some embodiments the angle of grating may be greater than 0 and less than approximately 60 degrees. In some embodiments the angle of grating may be between approximately 20 and approximately 50 degrees. By using such a mirror, efficiency of the optical apparatus may be increased because the angled shadow facets may prevent light being introduced to the mirror by a waveguide from being reflected back towards the waveguide. Other advantages may be realized, as discussed below in greater detail.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

In various embodiments, the phrase "a first layer formed, deposited, or otherwise disposed on a second layer" may mean that the first layer is formed, deposited, grown, bonded, or otherwise disposed over the second layer, and at least a part of the first layer may be in direct contact (e.g., direct physical and/or electrical contact) or indirect contact (e.g., having one or more other layers between the first layer and the second layer) with at least a part of the second layer.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Figure 1:
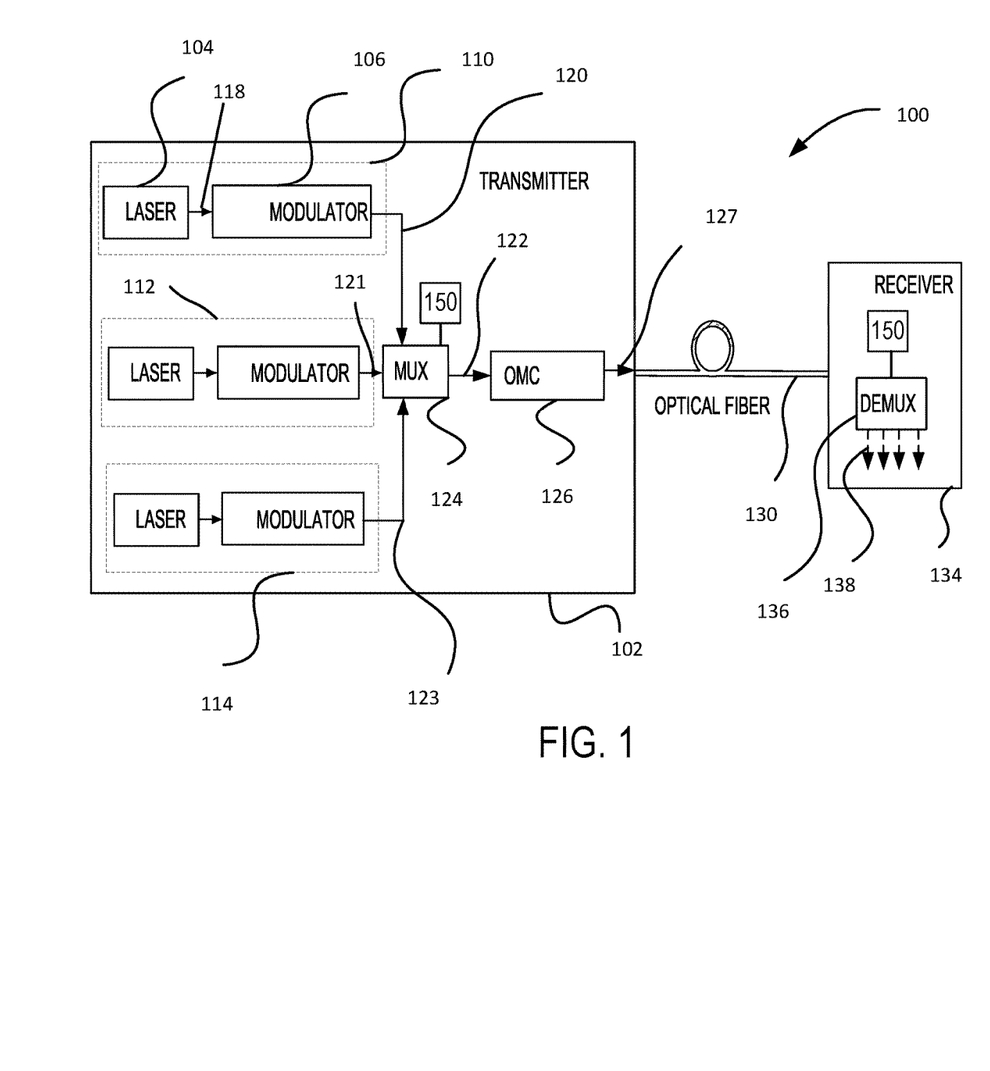
FIG. 1 is a block diagram of an optoelectronic system that may include a multiplexer and/or demultiplexer with a mirror having echelle grating configured to provide total internal reflection of light, in accordance with some embodiments.

FIG. 1 is a block diagram of an optoelectronic system 100 that may include a multiplexer and/or demultiplexer with a mirror that has an echelle grating configured to reduce back-reflection of light, in accordance with some embodiments. The optoelectronic system 100 may be used to transmit an optical signal modulated with a data signal via an optical fiber, for example, between racks in a data center, or long distance, between data storage facilities, data centers, and the like.

The optoelectronic system 100 may include an optical device such as transmitter 102 (e.g., photonic chip). The transmitter 102 may include one or more light sources (e.g., laser devices) 104 to provide a light signal 118 (e.g., constant light intensity signal) to a respective modulator 106 to modulate input light according to a data signal to be transmitted. Each combination of the light source 104 and corresponding modulator 106 may comprise a communication channel 110, 112, 114. Although three communication channels are shown, fewer or multiple more communication channels may be used in a transmitter such as 102, e.g., to provide a desired data transmission rate. The modulator 106 may output a modulated optical signal 120 to a multiplexer 124 having a mirror 150 with an echelle grating that provides reduced back-reflection as described herein. Similarly, communication channels 112, 114 may output modulated signals 121, 123 to the multiplexer 124. Signals 120, 121, 123 multiplexed from communication channels 110, 112, and 114 may be input as a combined signal 122 to an optical mode converter (e.g., coupler) 126.

The optical mode converter 126 may provide the interface from the multiplexer 124 with the mirror 150 on the photonic chip to an optical communication channel (e.g., optical fiber cable) 130 and is configured to transfer the combined optical signal 127 to the optical communication channel 130, to be received by a receiver 134. In embodiments, the receiver 134 may include a demultiplexer 136 having the mirror 150 with an echelle grating that provides reduced back-reflection of light as described herein. The demultiplexer 136 may be configured to demultiplex signal 127 into multiple signals 138, according to techniques described herein.

Figure 2:
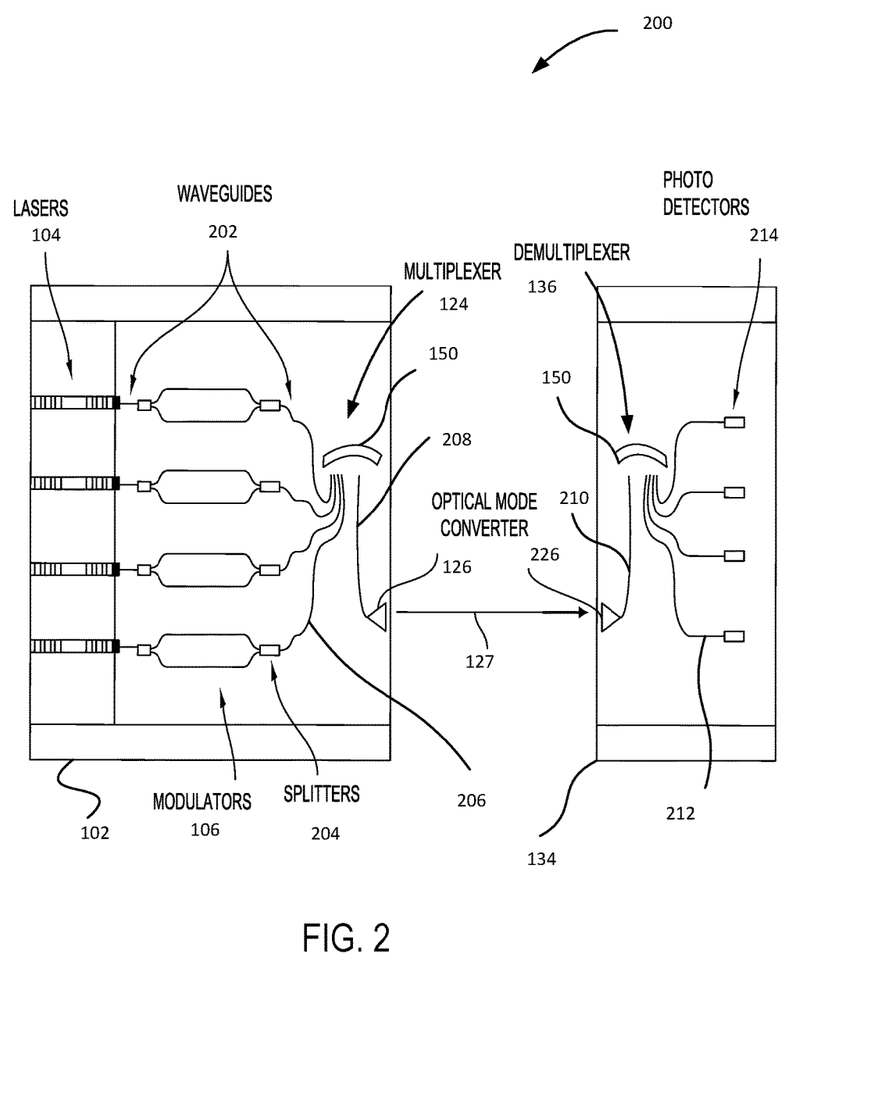
FIG. 2 is an example implementation of the optoelectronic system as an integrated photonics link, in accordance with some embodiments.

FIG. 2 is an example implementation of the optoelectronic system of FIG. 1 as an integrated photonics link 200, in accordance with some embodiments. Similar to the system 100 described above, the link 200 may include a transmitter 102 and receiver 134. The transmitter 102 may include multiple lasers 104 and waveguides 202 comprising modulators 106 and splitters 204. The optical signals generated by the lasers 104 may be provided through the waveguides 202 and splitters 204 to the mirror 150 of the multiplexer 124 with multiple input waveguides 206, according to wavelengths of each of the waveguides 206. The mirror 150 may reflect the optical signals of different wavelengths and combine the signals due to the echelle grating effect of the mirror. An output waveguide 208 may receive the combined optical signal and transmit the optical signal to the optical mode converter 126. The optical mode converter 126 may provide the optical signal 127 converted from the combined optical signal to the receiver 134, to be converted by an optical mode converter 226 of the receiver 134. The converted optical signal may then be input into the demultiplexer 136 with the mirror 150 via the input waveguide 210. The mirror 150 may reflect the optical signal, which may be split by wavelengths due to echelle grating effect of the mirror 150. The split portions of the signal may be received by multiple output waveguides 212 according to corresponding wavelengths of the waveguides 212. The portions of the output signal may be provided via the output waveguides 212 to photodetectors 214, to be further processed as desired. Various embodiments of the multiplexer 124 or demultiplexer 136 having the mirror 150 with echelle grating surface that provides reduced back-reflection of light will be described below in greater detail.

Figure 3:
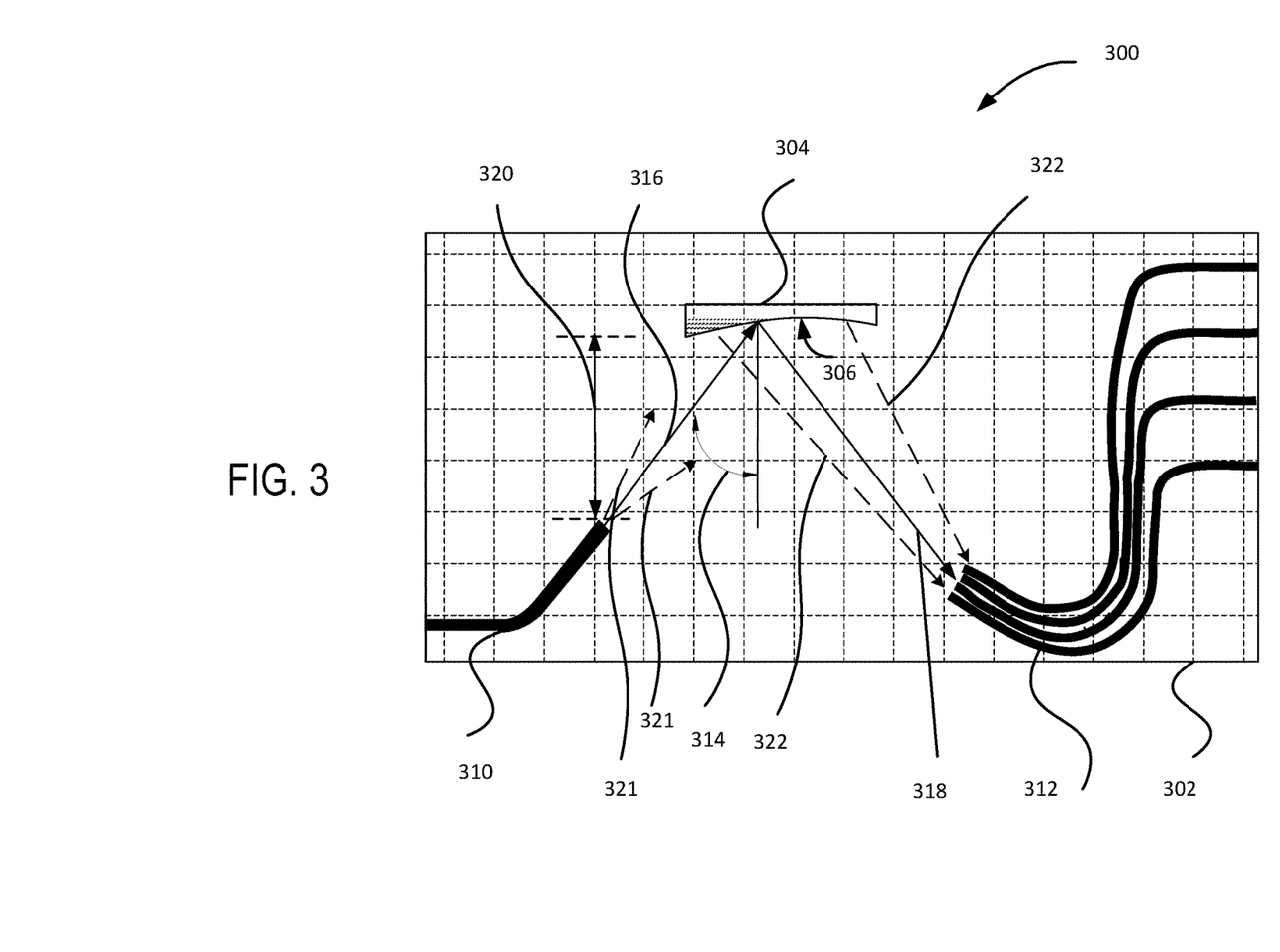
FIG. 3 illustrates an example top view of an optical device comprising a mirror with echelle grating surface configured to provide total internal reflection of light, in accordance with some embodiments.

FIG. 3 illustrates an example view of an optical device 300 comprising a mirror with an echelle grating surface with reduced back-reflection of light, in accordance with some embodiments. It will be appreciated that a multiplexer such as 124 or demultiplexer such as 136 may be implemented according to the embodiments described in reference to FIG.

3. For simplicity purposes, the optical device illustrated in FIG. 3 comprises a demultiplexer.

In some embodiments, the optical device 300 may be formed on a silicon-on-insulator (SOI) platform. Accordingly, the optical device 300 may be formed in a semiconductor layer (e.g., including silicon (Si)) 302 or other silicon-based material. For example, in some embodiments, the semiconductor layer 302 may be provided on high index waveguide platforms, such as silicon nitride ($Si_3N_4$) waveguide-buried oxide (BOX)-Si substrate, or silicon oxynitride (SiON) waveguide-BOX-Si substrate. The optical device may include a mirror 304 disposed inside the semiconductor layer 302, and having echelle grating reflective surface 306 to reflect light propagating inside the semiconductor layer 302. In some embodiments, the reflection may be total or substantially total internal reflection. The optical device 300 may be configured such that the light propagating inside the semiconductor layer 302 may be confined in a vertical direction (e.g., by sandwiching the semiconductor layer 302 between dielectric layers). The mirror 304 may be formed in a trench disposed in the semiconductor layer 302.

The reflective surface 306 of the mirror 304 may comprise a plurality of linear or curved micro-mirrors disposed on a substantially non-linear-shaped (e.g., curved) surface of the mirror 306, to provide constructive interference for the light directed at the mirror 304. The gratings may be constructed using various focusing geometries such as a Roland circle or ellipse. In a Roland circle, micro-mirror centers may be located about the circumference of a circle. In the elliptical disposition, micro-mirror centers may be determined based on the grating equation.

The mirror 304 may be formed by an interface of two media: the semiconductor layer 302 comprising the mirror reflective surface 306 and another medium (e.g., air or dielectric material) that may fill the trench in which the mirror 304 may be formed. That other medium may have a refractive index that is lower than that of the semiconductor layer 302, to provide the total or substantially total internal reflection of light by the mirror 304. For example, the trench disposed in the semiconductor layer 302 may be filled with a dielectric material, e.g., oxide. Accordingly, the refraction index of the semiconductor material may be greater than the refraction index of the dielectric material comprising the reflective surface 306 of the mirror 304, providing for a total or substantially total internal reflection (TIR) of light 316 directed at the mirror 304 by the input waveguide 310.

The input and output waveguides 310 and 312 may be disposed at determined distances 320 from the reflective surface 306 of the mirror 304. Accordingly, when light 316 enters the semiconductor layer 302 from the input waveguide 310, it may be spatially dispersed within the silicon slab region (as indicated by arrows 321), then reflected from the reflective surface 306 (as indicated by arrows 322), and refocused by the reflective surface 306 of the mirror 304 at the output waveguide 312 as indicated by 318.

If the optical device 300 comprises a demultiplexer, due to echelle grating effect of the reflective surface 306, portions of the reflected light 318 may be received by multiple output waveguides 312 according to their respective wavelengths. Similarly, if the optical device 300 comprises a multiplexer, due to echelle grating effect of the reflective surface 306, portions of the reflected light 318 may be received by the mirror 304 according to their respective wavelengths and reflected into the output waveguides 312 (indicated by reflected light 318).

As described above, the orientation of the waveguides 310, 312 may be defined such that the angle of incidence 314 on the surface 306 may be greater than the critical angle required for TIR. Depending on the type of the device 300 (e.g., multiplexer or demultiplexer), each of the input or output waveguides may correspond to a particular wavelength of inputted light (in a multiplexer) or reflected light (in a demultiplexer).

Figure 4A:
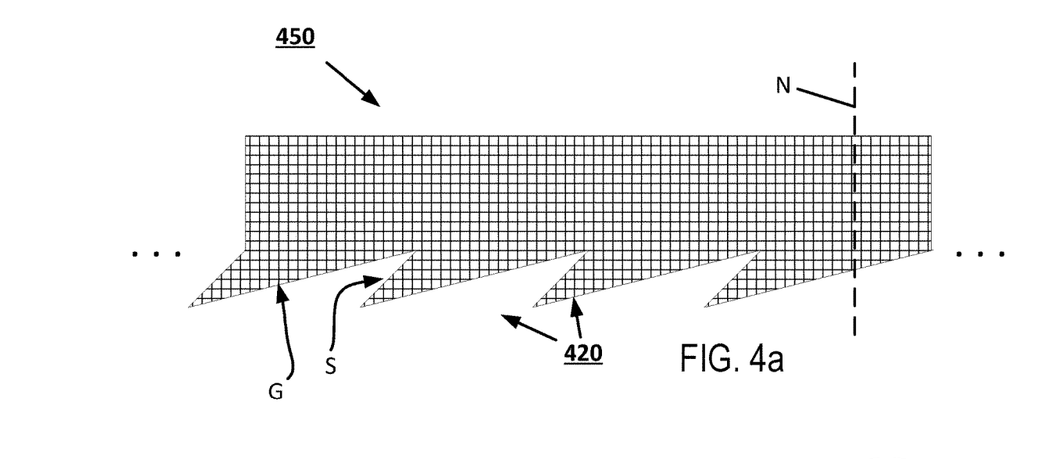
FIGS. 4a and 4b illustrate an example mirror with an echelle grating with reduced back-reflection, in accordance with some embodiments.
Figure 4B:
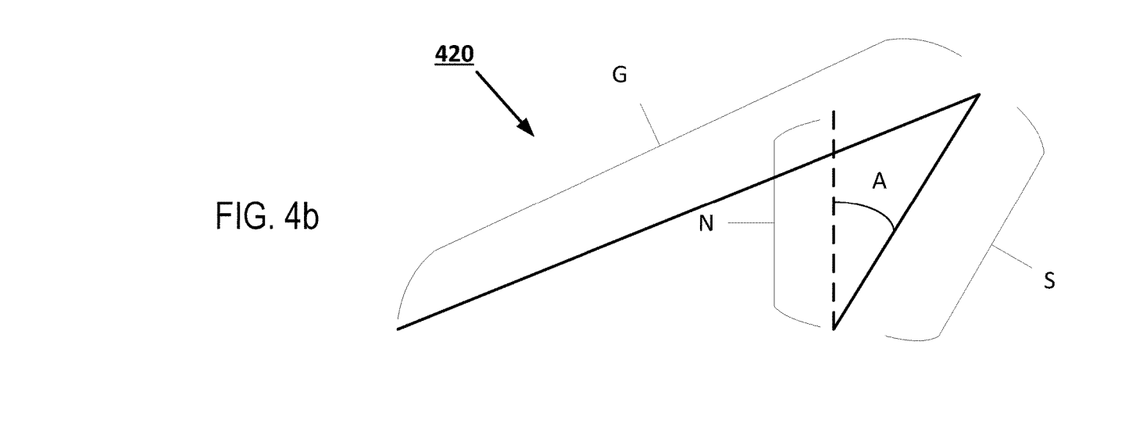

FIGS. 4a and 4b illustrate an example mirror with an echelle grating with reduced back-reflection, in accordance with some embodiments. Specifically, FIG. 4a depicts an example portion of a mirror 450, which may be similar to mirror 150. It will be understood that mirror 450 is shown as generally flat/linear for the purposes of this description only. As discussed above, generally mirror 450 may be curved or rounded, for example elliptical or curved in accordance with a Roland circle.

The mirror 450 may include a plurality of grating teeth 420. FIG. 4b depicts the various elements of a grating tooth 420 in greater detail. Specifically, the grating tooth 420 may include two facets. The first facet, marked "G" in FIGS. 4a and 4b, may be referred to as a "grating facet." The second facet, marked "S" in FIGS. 4a and 4b, may be referred to as a "shadow facet." The dashed line (marked "N" in FIGS. 4a and 4b) represents the "normal" angle (e.g., 0 degrees) with respect to the mirror 450. The normal N may be described as, for example, the angle with respect to a curve of the curved echelle grating that makes up the mirror 450.

As shown in FIGS. 4a and 4b, the shadow facet S may have an angle of grating A with respect to normal N. In some embodiments, the angle of grating A may be less than approximately 60 degrees. More specifically, in some embodiments the angle of grating A may be between approximately 20 and approximately 50 degrees.

Figure 5:
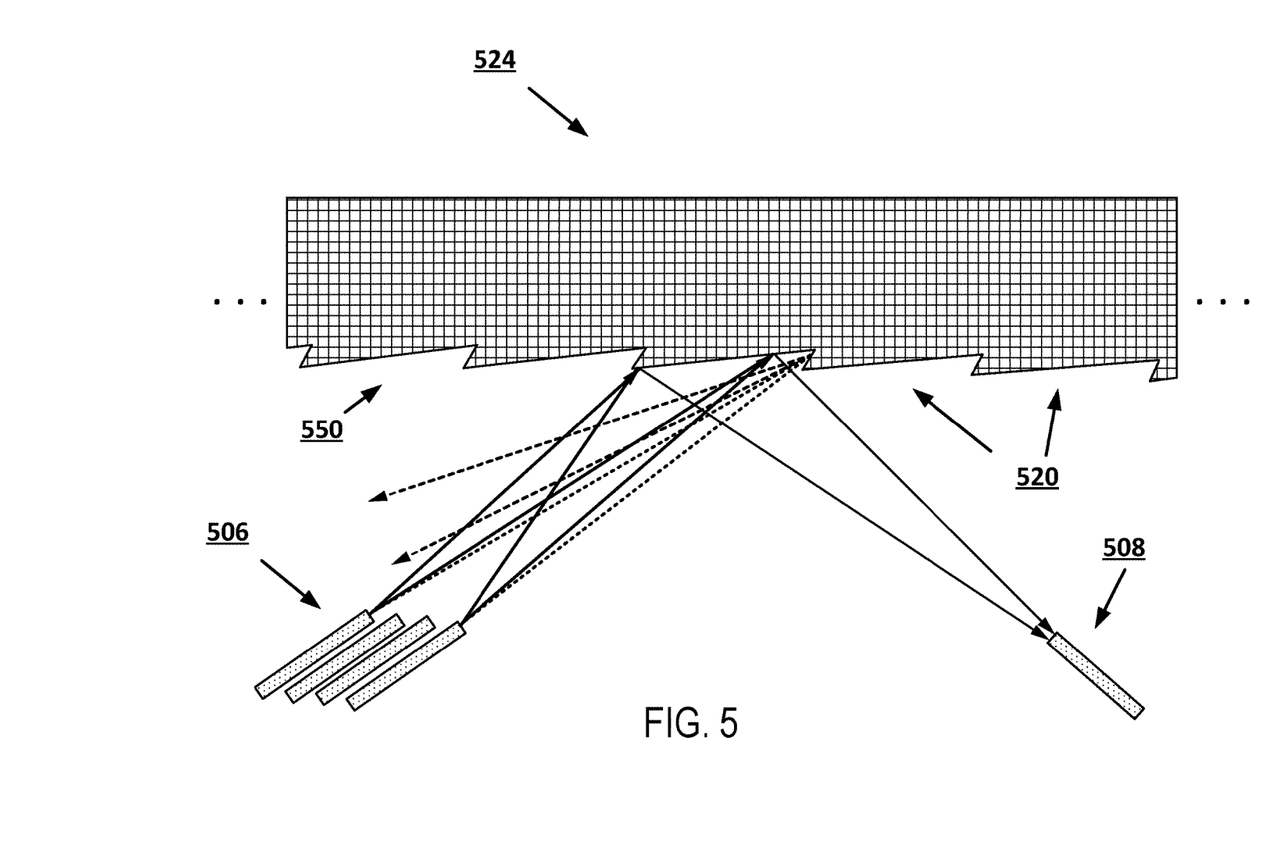
FIG. 5 illustrates an example multiplexer that uses a mirror with an echelle grating with reduced back-reflection, in accordance with some embodiments.

FIG. 5 illustrates an example multiplexer that uses a mirror with an echelle grating with reduced back-reflection, in accordance with some embodiments. More specifically, FIG. 5 depicts an example multiplexer 524 that uses a mirror 550 with low back reflection. The multiplexer 524 may be, for example, similar to multiplexer 124. The mirror 550 may be similar to, for example, mirrors 150 or 450. Specifically, the mirror 550 may include a plurality of grating teeth 520, which may be similar to grating teeth 420. Similarly to grating teeth 420, respective ones of the grating teeth 520 may have both a shadow facet S and a grating facet G (not marked in FIG. 5 for the sake of clarity). As shown in FIG. 5, the shadow facet S may be angled away from normal by an angle of grating A (also not marked in FIG. 5 for the sake of clarity).

Light, for example laser light produced by lasers 104, may enter the multiplexer 524 via a plurality of waveguides 506. The waveguides 506 may be similar to, for example, waveguides 206. As shown by the solid lines in FIG. 5, the light may reflect off of the grating teeth 520 through the total internal reflection, and particularly the grating facet G of the grating teeth 520, to waveguide 508. Waveguide 508 may be similar to, for example, wave guide 208. In this way, the light from the various waveguides 506 may be focused into the single waveguide 508, i.e. multiplexed.

In legacy mirrors where the shadow facet was not angled away from normal by an angle of grating A, that is mirrors where the grating facet is aligned with the normal N, light from waveguides 506 could be reflected back by the shadow facet S towards waveguides 506. In these legacy mirrors, that reflected light could coherently and inherently interfere with the light from the waveguides 506, thereby degrading performance of the multiplexer.

However, in mirror 550 where the shadow facet S is angled away from normal by an angle of grating A, for example as shown in FIG. 5, the light may be reflected by the shadow facets without being reflected directly back towards the waveguides 506. This phenomenon is depicted by the dotted lines with arrows in FIG. 5. Specifically, the dotted lines are shown to depict the path of the light from the waveguides 506 and then reflected from the shadow facet. As can be seen, the light represented by the dotted lines leaves waveguides 506, strikes the shadow facet of the grating tooth 520, and then is reflected in a direction that is not directly towards the waveguides 506. In this way, the above-described interference may be avoided, which may reduce the external back reflection to the laser and increase the laser stability of a transmitter such as transmitter 102.

Figure 6:
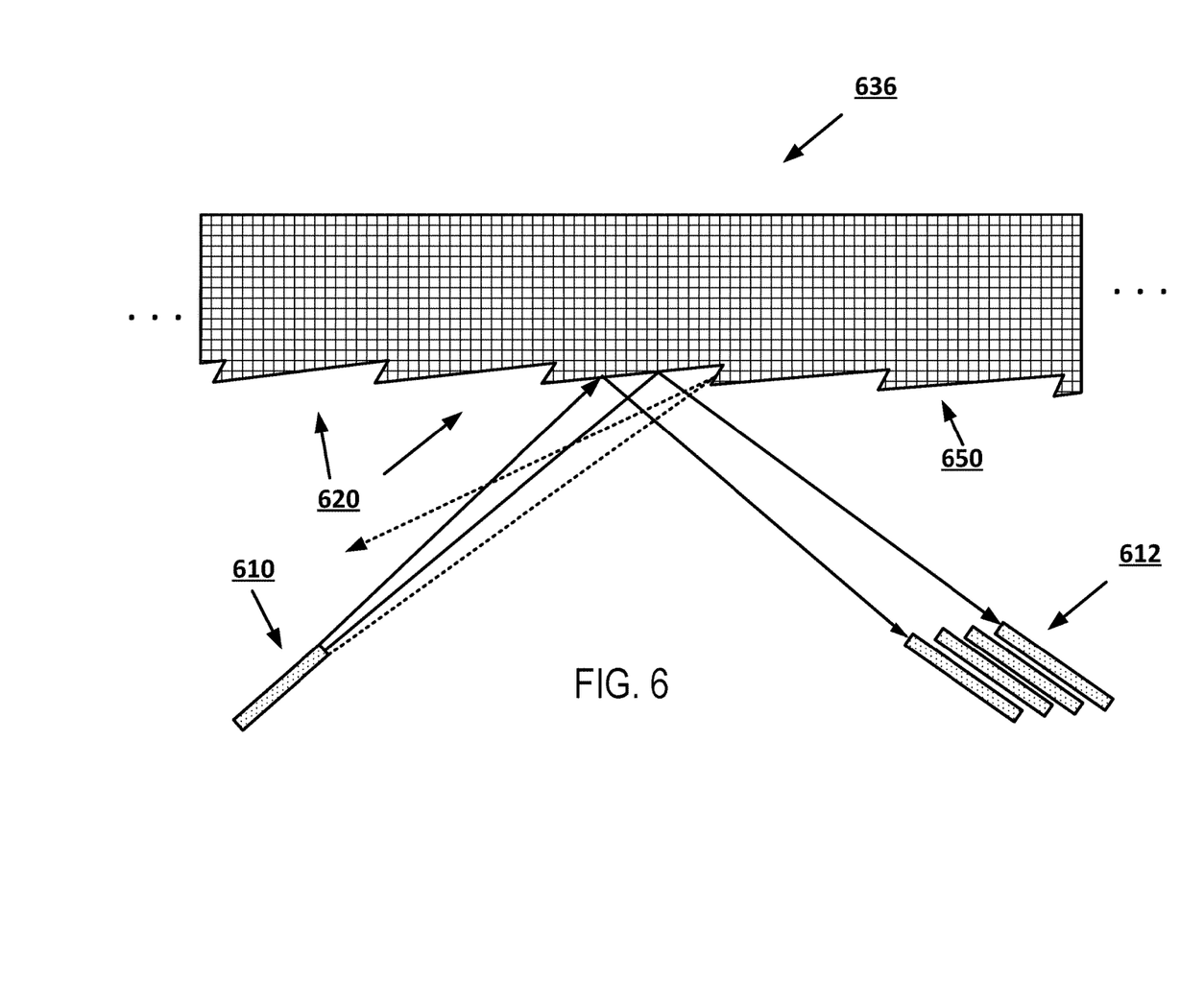
FIG. 6 illustrates an example demultiplexer that uses a mirror with an echelle grating with reduced back-reflection, in accordance with some embodiments.

FIG. 6 illustrates an example demultiplexer that uses a mirror with an echelle grating with reduced back-reflection, in accordance with some embodiments. More specifically, FIG. 6 depicts a demultiplexer 636 that may include a mirror 650. The demultiplexer may be similar to, for example, demultiplexer 136. The mirror 650 may be similar to, for example, mirrors 150, 450, 550, etc. Specifically, the mirror 650 may include a plurality of grating teeth 620, which may be similar to grating teeth 420, 520, etc. Although not marked in FIG. 6 for the sake of clarity, the respective grating teeth 620 may include both a shadow facet and a grating facet such as those shown in FIG. 4b. The shadow facet S may be angled away from a normal angle (with respect to the mirror 650) by an angle of grating A.

Light, for example laser light produced by lasers 104, multiplexed by a multiplexer such as multiplexer 124, and transmitted along an optical fiber such as optical fiber 130, may enter the demultiplexer 636 via a waveguide 610. Waveguide 610 may be similar to waveguide 210. The light may then be reflected by one or more of the grating teeth 620 and directed towards waveguides 612, which may be similar to waveguides 212. In this way, the light may be demultiplexed by the demultiplexer 636.

Similarly to FIG. 5, in mirror 650 where the shadow facet S is angled away from normal by an angle of grating A, the light may be reflected by the shadow facets without being reflected directly back towards the waveguide 610. This phenomenon is depicted by the dotted line with an arrow in FIG. 6. Specifically, the dotted line is shown to depict the path of the light from the waveguide 610 and then reflected from the shadow facet. As can be seen, the light represented by the dotted line leaves the waveguides 610, strikes the shadow facet of the grating tooth 620, and then is reflected in a direction that is not directly towards the waveguide 610. In this way, the above-described interference may be avoided, which may reduce the external back reflection to the laser and increase the laser stability of a receiver such as receiver 134.

It will be noted that although the light in FIG. 5 is shown as reflecting from a single grating tooth, in practice the light may reflect from a plurality of the different grating teeth such as shown in FIG. 6. Similarly, although light is shown as reflecting from a plurality of grating teeth in FIG. 6, in practice the light may reflect from a single grating tooth such as shown in FIG. 5. Additionally, although only 4 waveguides are shown for waveguides 612 and 506, other embodiments may have more or fewer waveguides.

Generally, the mirrors 550 and 650 may provide various advantages over legacy mirrors. For example, the mirrors with the angled shadow facets such as shown in FIGS. 4a, 4b, 5, and 6 may not affect various metrics by which the mirrors may be measured. These metrics may include grating efficiency, grating aspect ratio (which may be defined as the length of the grating facet G divided by the length of the shadow facet S), and the figure-of-merit of the grating. As such, performance of the multiplexer 524 or the demultiplexer 636 measured in terms of loss or bandwidth may be the same or better than legacy multiplexers or demultiplexers, while also providing the advantage of reduced back reflection.

Figure 7:
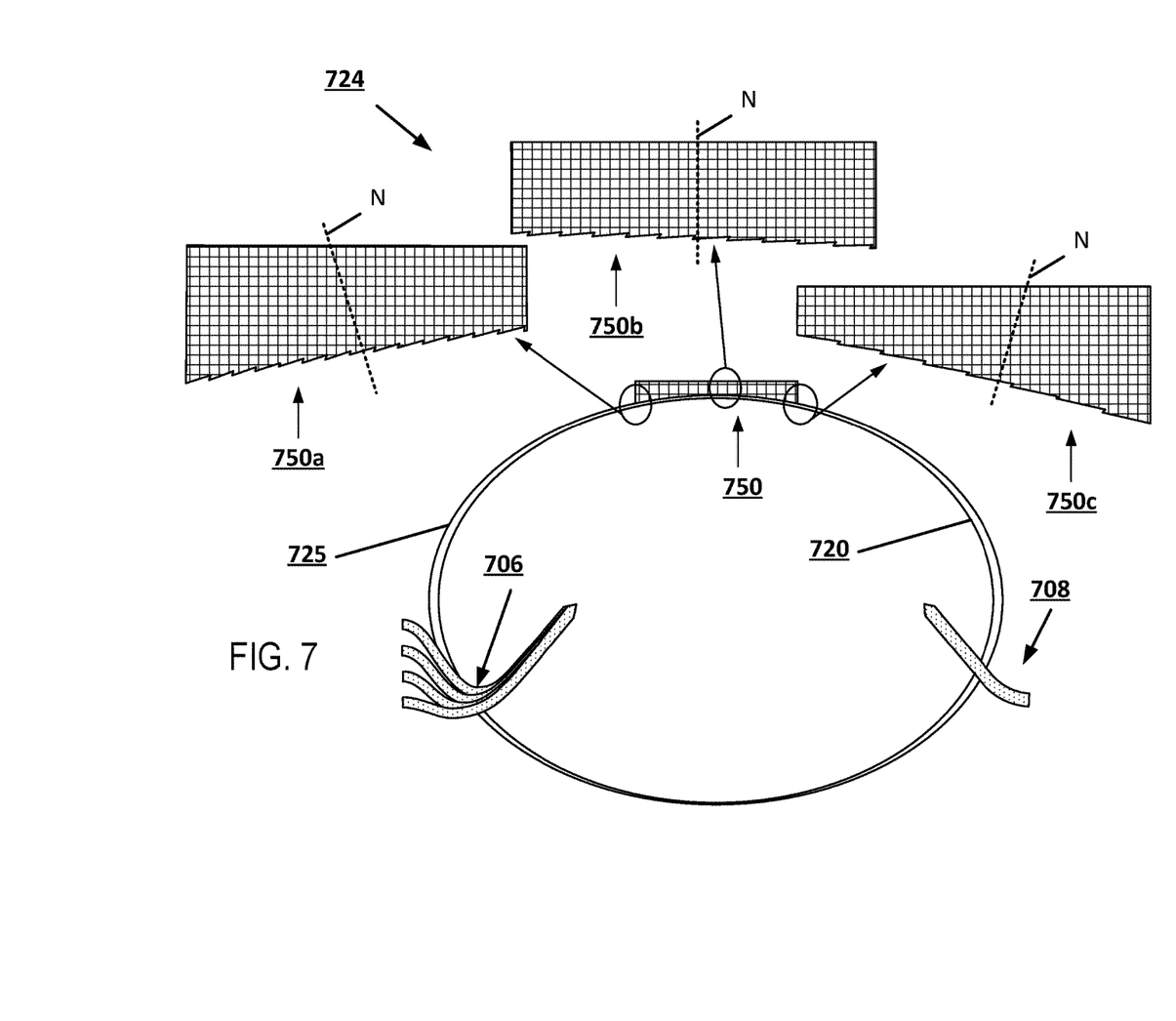
FIG. 7 illustrates an alternative view of an example multiplexer with a mirror that uses an echelle grating with reduced back-reflection, in accordance with some embodiments.

FIG. 7 depicts an alternative view of an example multiplexer 724. The multiplexer 724 may be similar to, for example, multiplexers 124 or 524. The multiplexer 724 may include a mirror 750, which may be similar to mirror 150 or 550. Light may be input to the multiplexer 724 by waveguides 706 (which may be similar to waveguides 206 or 506) and then focused by the mirror 750 and reflected to waveguide 708 (which may be similar to waveguide 208 or 508).

As shown in FIG. 7, the mirror 750 may be curved in accordance with an elliptical curve 725 or a Roland curve 720. Elements 750a, 750b, and 750c are different portions of the mirror 750 at different points along the elliptical or Roland curves. As can be seen, the normal N may change at the different portions 750a-c. For example, in portion 750a the normal N may be tilted slightly to the left (as shown in FIG. 7). The normal N may be generally vertical in portion 750b, and tilted slightly to the right in portion 750c. As can be seen in FIG. 7, the angle of grating A may likewise rotate so that the angle of the shadow facets remains constant with respect to the normal N as the normal N shifts along the curve of the mirror 750 from portion 750a to 750c. In other embodiments, the normal N may remain defined with respect to portion 750b (that is, generally vertical with respect to FIG. 7) and the angle of grating A may be measured with respect to that constant normal from portions 750a to 750c.

Figure 8:
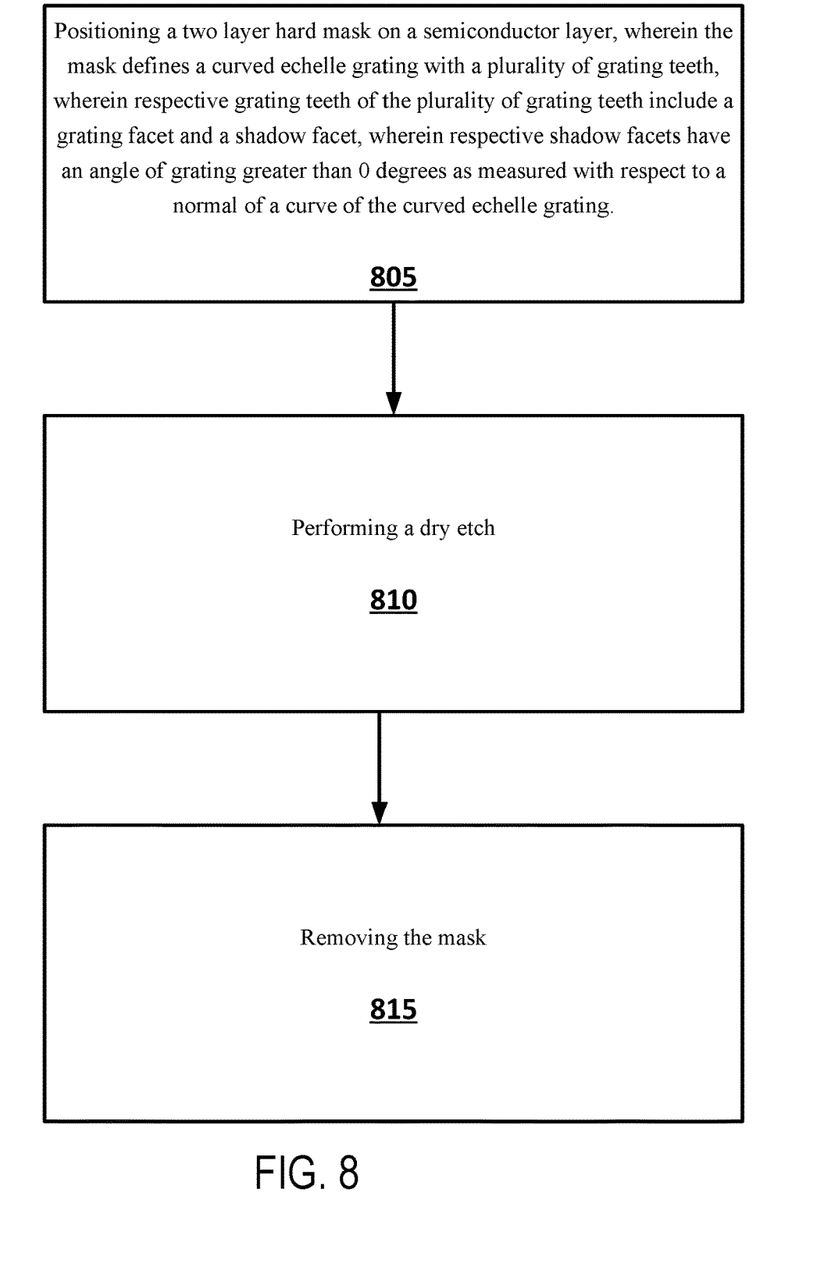
FIG. 8 illustrates an example technique for making a mirror that has an echelle grating with reduced back-reflection, in accordance with some embodiments.

FIG. 8 illustrates an example technique for making a mirror that has an echelle grating with reduced back-reflection, in accordance with some embodiments. Specifically, the technique may include, at 805 positioning a two layer hard mask on a semiconductor layer such as semiconductor layer 302. The mask may define a curved echelle grating that has a plurality of grating teeth such as grating teeth 420, 520, 620, etc. Respective grating teeth of the plurality of grating teeth may include a grating facet (e.g., grating facet G in FIG. 4b) and a shadow facet (e.g. shadow facet S in FIG. 4b.). Respective shadow facets may have an angle of grating (e.g., angle of grating A in FIG. 4b) that is greater than 0 degrees as measured with respect to a normal of a curve of the curved echelle grating. For example, the angle of grating may be measured with respect to the normal N of the curve as described above with respect to FIG. 7 and elsewhere. As discussed above, the angle of grating may be less than approximately 60 degrees and, in some embodiments, may be between approximately 20 and approximately 50 degrees.

The technique may then include, at 810, performing a dry etch of the mask. The dry etch technique may etch the semiconductor layer around the mask to define the curved echelle grating in the semiconductor layer.

The technique may then include, at 815, removing the mask. Doing so may leave the semiconductor layer with the curve echelle grating therein.

Figure 9:
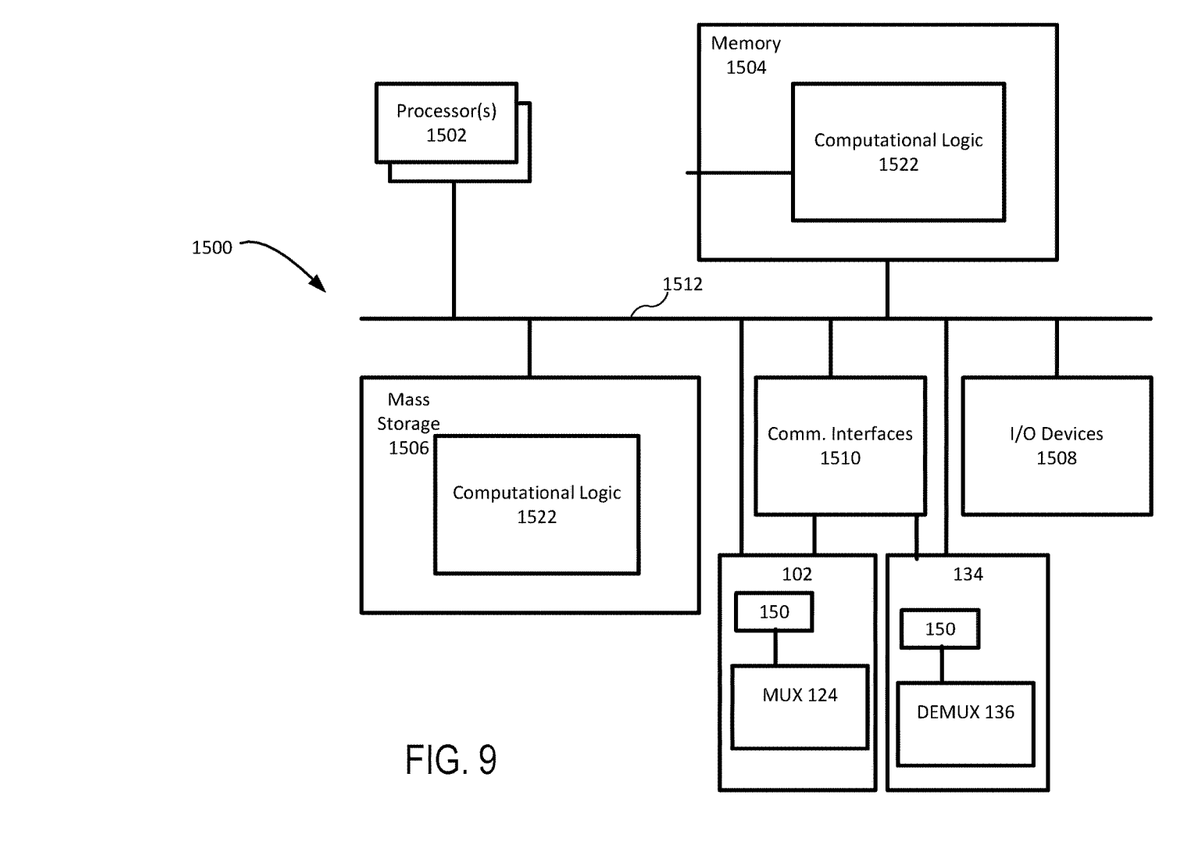
FIG. 9 illustrates an example computing device suitable for use with various components of an optoelectronic system, such as a transmitter having the multiplexer with the echelle grating with the reduced back-reflection and/or receiver having the demultiplexer with the echelle grating with the reduced back-reflection, in accordance with various embodiments.

FIG. 9 illustrates an example computing device 1500 suitable for use with various components of FIG. 1, such as optoelectronic system 100 including transmitter 102 having the multiplexer 124 with the echelle grating mirror 150 and/or receiver 134 having the demultiplexer 136 with the mirror 150, in accordance with various embodiments. As shown, computing device 1500 may include one or more processors or processor cores 1502 and system memory 1504. For the purpose of this application, including the claims, the terms "processor" and "processor cores" may be considered synonymous, unless the context clearly requires otherwise. The processor 1502 may include any type of processors, such as a central processing unit (CPU), a microprocessor, and the like. The processor 1502 may be implemented as an integrated circuit having multi-cores, e.g., a multi-core microprocessor. The computing device 1500 may include mass storage devices 1506 (such as diskette, hard drive, volatile memory (e.g., dynamic random-access memory (DRAM), compact disc read-only memory (CD-ROM), digital versatile disk (DVD), and so forth). In general, system memory 1504 and/or mass storage devices 1506 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth.

The computing device 1500 may further include input/output (I/O) devices 1508 (such as a display (e.g., a touchscreen display), keyboard, cursor control, remote control, gaming controller, image capture device, and so forth) and communication interfaces 1510 (such as network interface cards, modems, infrared receivers, radio receivers (e.g., Bluetooth), and so forth). In some embodiments, the communication interfaces 1510 may include or otherwise be coupled with the transmitter 102 having the multiplexer 124 with the echelle grating mirror 150 and/or receiver 134 having the demultiplexer 136 with the mirror 150 as described herein, in accordance with various embodiments. It will be understood for descriptions herein that multiplexer 124 and demultiplexer 136 are used for the description herein as stand-ins for the additional multiplexers (e.g. 524) and demultiplexers (636) described herein. Generally, with respect to descriptions of computing device 1500, the multiplexer or the demultiplexer may be implemented with the mirror 450 depicted in FIG. 4*a* where the grating facet G is offset from normal N by an angle of grating A.

The communication interfaces 1510 may include communication chips (not shown) that may be configured to operate the device 1500 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1510 may operate in accordance with other wireless protocols in other embodiments.

The above-described computing device 1500 elements may be coupled to each other via system bus 1512, which may represent one or more buses. In the case of multiple buses, they may be bridged by one or more bus bridges (not shown). Each of these elements may perform its conventional functions known in the art. In particular, system memory 1504 and mass storage devices 1506 may be employed to store a working copy and a permanent copy of the programming instructions for the operation of the transmitter 102 of FIG. 1. The various elements may be implemented by assembler instructions supported by processor(s) 1502 or high-level languages that may be compiled into such instructions.

The permanent copy of the programming instructions may be placed into mass storage devices 1506 in the factory, or in the field, through, for example, a distribution medium (not shown), such as a compact disc (CD), or through communication interface 1510 (from a distribution server (not shown)). That is, one or more distribution media having an implementation of the agent program may be employed to distribute the agent and to program various computing devices.

The number, capability, and/or capacity of the elements 1508, 1510, 1512 may vary, depending on whether computing device 1500 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 1504 may include computational logic 1522 configured to practice aspects of embodiments, such as operation of the transmitter 102 and/or receiver 134, as described in reference to FIG. 1 and elsewhere. For one embodiment, at least one of processors 1502 may be packaged together with computational logic 1522 configured to practice aspects of optical signal transmission and receipt described herein to form a System in Package (SiP) or a System on Chip (SoC).

The computing device 1500 may include or otherwise be associated with an optoelectronic system, such as system 100 implementing aspects of the transmitter 102 and/or receiver 134, including the multiplexer 124 and/or demultiplexer 136 as described above. In some embodiments, at least some components of the optoelectronic system 100 (e.g., transmitter 102 and/or receiver 134) may be communicatively coupled with the computing device 1500 and/or be included in one or more of the computing device 1500 components, such as communication interfaces 1510, for example.

In various implementations, the computing device 1500 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 1500 may be any other electronic device that processes data.

Example 1 may include an optical apparatus comprising: a semiconductor layer to propagate light from at least one light source; and a curved echelle grating with a plurality of grating teeth, the echelle grating at an outer side of the semiconductor layer; wherein the curved echelle grating includes a plurality of grating teeth, a grating tooth of the plurality of grating teeth with a grating facet and a shadow facet, wherein respective shadow facets have an angle of grating greater than 0 degrees with respect to a normal of a curve of the curved echelle grating.

Example 2 may include the optical apparatus of example 1, wherein the shadow facet has an angle of grating of less than approximately 60 degrees.

Example 3 may include the optical apparatus of example 2, wherein the shadow facet has an angle of grating of between approximately 20 degrees and approximately 50 degrees.

Example 4 may include the optical apparatus of any of examples 1-3, wherein a first shadow facet of the respective shadow facets has an angle that is the same as an angle of a second shadow facet of the respective shadow facets.

Example 5 may include the optical apparatus of any of examples 1-3, wherein the curve is an elliptical curve or a Roland curve.

Example 6 may include the optical apparatus of any of examples 1-3, wherein the optical apparatus is a multiplexer or a demultiplexer.

Example 7 may include the optical apparatus of any of examples 1-3, wherein the curved echelle grating is internally reflective.

Example 8 may include the optical apparatus of any of examples 1-3, wherein the shadow facet is to reflect the light back towards an input waveguide coupled with the optical apparatus.

Example 9 may include an apparatus comprising: a light source; a waveguide coupled with the light source at a first side of the waveguide, the waveguide to propagate light from the light source; and an optical apparatus coupled with the waveguide at a second side of the waveguide opposite the first side, wherein the optical apparatus includes a curved echelle grating with a plurality of grating teeth; wherein the curved echelle grating includes a plurality of grating teeth, respective teeth of the plurality of grating teeth with a grating facet and a shadow facet, and wherein respective shadow facets have an angle of grating greater than 0 degrees with respect to a normal of a curve of the curved echelle grating.

Example 10 may include the apparatus of example 9, wherein the shadow facet has an angle of grating of less than approximately 60 degrees.

Example 11 may include the apparatus of example 10, wherein the shadow facet has an angle of grating of between approximately 20 degree and approximately 50 degrees.

Example 12 may include the apparatus of any of examples 9-11, wherein a first shadow facet of the respective shadow facets has an angle that is the same as an angle of a second shadow facet of the respective shadow facets.

Example 13 may include the apparatus of any of examples 9-11, wherein the curve is an elliptical curve or a Roland curve.

Example 14 may include the apparatus of any of examples 9-11, wherein the optical apparatus is a multiplexer or a demultiplexer.

Example 15 may include the apparatus of any of examples 9-11, wherein the curved echelle grating is internally reflective.

Example 16 may include the apparatus of any of examples 9-11, wherein the shadow facet is to reflect the light back towards the waveguide.

Example 17 may include a method comprising: positioning a two layer hard mask on a semiconductor layer, wherein the mask defines a curved echelle grating with a plurality of grating teeth, wherein respective grating teeth of the plurality of grating teeth include a grating facet and a shadow facet, wherein respective shadow facets have an angle of grating greater than 0 degrees as measured with respect to a normal of a curve of the curved echelle grating; performing a dry etch; and removing the mask.

Example 18 may include the method of example 17, wherein the mask include a thin silicon nitride (Si3N4) layer and a silicon oxide (SiO2) layer.

Example 19 may include the method of example 17, wherein the dry etch is a silicon dry etch.

Example 20 may include the method of any of examples 17-19, wherein the shadow facet has an angle of grating of less than approximately 60 degrees.

Example 21 may include the method of any of examples 17-19, wherein the shadow facet has an angle of grating of between approximately 20 degree and approximately 50 degrees.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. An optical apparatus comprising:
    a semiconductor layer to propagate a light from a waveguide; and
    a curved echelle grating at an outer side of the semiconductor layer;
    wherein the curved echelle grating includes a plurality of grating teeth, a grating tooth of the plurality of grating teeth with a grating facet and a shadow facet, wherein the light from the waveguide strikes the shadow facet of the grating tooth, and then is reflected in a direction not directly towards the waveguide to reduce interference with the light from the waveguide, and respective shadow facets have an angle of grating greater than 0 degrees and less than approximately 60 degrees with respect to a normal of a curve of the curved echelle grating.

2. The optical apparatus of claim 1, wherein the shadow facet has an angle of grating of between approximately 20 degrees and approximately 50 degrees.

3. The optical apparatus of claim 1, wherein a first shadow facet of the respective shadow facets has an angle that is the same as an angle of a second shadow facet of the respective shadow facets.

4. The optical apparatus of claim 1, wherein the curve is an elliptical curve or a Roland curve.

5. The optical apparatus of claim 1, wherein the optical apparatus is a multiplexer or a demultiplexer.

6. The optical apparatus of claim 1, wherein the curved echelle grating is internally reflective.

7. The optical apparatus of claim 1, wherein the shadow facet is to reflect the light back towards an input waveguide coupled with the optical apparatus.

8. An apparatus comprising:
a light source;
a waveguide coupled with the light source at a first side of the waveguide, the waveguide to propagate light from the light source; and
an optical apparatus coupled with the waveguide at a second side of the waveguide opposite the first side, wherein the optical apparatus includes a curved echelle grating;
wherein the curved echelle grating includes a plurality of grating teeth, a grating tooth of the plurality of grating teeth with a grating facet and a shadow facet, a light from the waveguide strikes the shadow facet of the grating tooth, and then is reflected in a direction not directly towards the waveguide to reduce interference with the light from the waveguide, and wherein the shadow facet has an angle of grating greater than 0 degrees and less than approximately 60 degrees with respect to a normal of a curve of the curved echelle grating.

9. The apparatus of claim 8, wherein the shadow facet has an angle of grating of between approximately 20 degree and approximately 50 degrees.

10. The apparatus of claim 8, wherein a first shadow facet of respective shadow facets has an angle that is the same as an angle of a second shadow facet of the respective shadow facets.

11. The apparatus of claim 8, wherein the curve is an elliptical curve or a Roland curve.

12. The apparatus of claim 8, wherein the optical apparatus is a multiplexer or a demultiplexer.

13. The apparatus of claim 8, wherein the curved echelle grating is internally reflective.

14. The apparatus of claim 8, wherein the shadow facet is to reflect the light back towards the waveguide.

15. A method comprising:
positioning a two layer hard mask on a semiconductor layer, wherein the mask defines a curved echelle grating with a plurality of grating teeth, wherein respective grating teeth of the plurality of grating teeth include a grating facet and a shadow facet, a light from a waveguide strikes the shadow facet of a grating tooth, and then is reflected in a direction not directly towards the waveguide to reduce interference with the light from the waveguide, and wherein respective shadow facets have an angle of grating greater than 0 degrees and less than approximately 60 degrees as measured with respect to a normal of a curve of the curved echelle grating;
performing a dry etch; and
removing the mask.

16. The method of claim 15, wherein the mask include a thin silicon nitride (Si3N4) layer and a silicon oxide (SiO2) layer.

17. The method of claim 15, wherein the dry etch is a silicon dry etch.

18. The method of claim 15, wherein the shadow facet has an angle of grating of between approximately 20 degree and approximately 50 degrees.

* * * * *